Dec. 18, 1962  B. TOCCI-GUILBERT  3,068,664
RESILIENT COUPLING
Filed Jan. 13, 1961
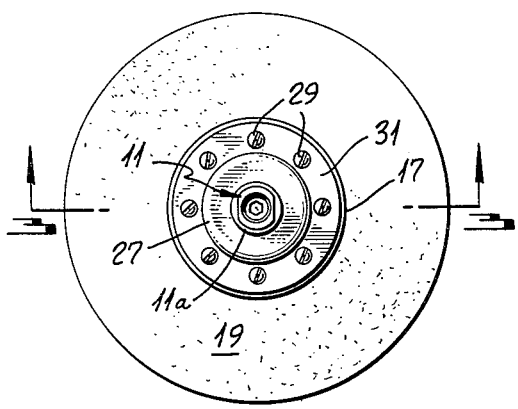
FIG_1
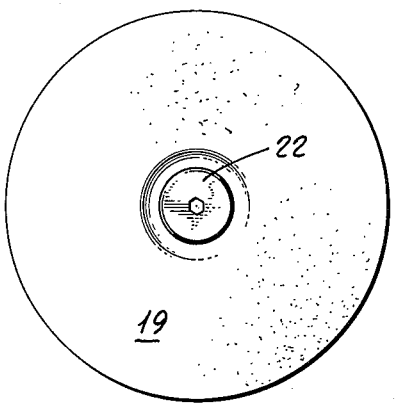
FIG_2
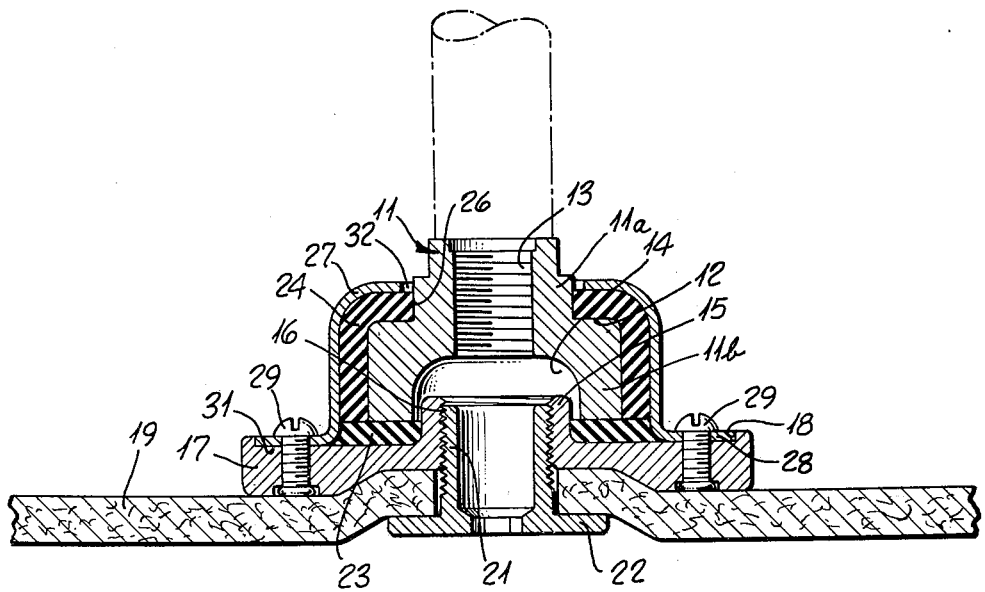
FIG_3
BERNE TOCCI-GUILBERT
INVENTOR.
BY 
ATTORNEYS United States Patent Office 3,068,664
Patented Dec. 18, 1962

3,068,664
RESILIENT COUPLING
Berne Tocci-Guilbert, 2323 Larkin St.,
San Francisco, Calif.
Filed Jan. 13, 1961, Ser. No. 82,428
5 Claims. (Cl. 64—11)

This invention relates generally to a resilient coupling for abrasive discs and more particularly to a resilient coupling for depressed center or raised hub abrasive discs.

Resilient coupling have heretofore been provided for abrasive discs as disclosed in Patents 2,486,078, 2,629,990 and 2,767,527. However, such resilient couplings have been found to be unsatisfactory for use with large abrasive discs when the abrasive discs are used for heavy duty operations. There is, therefore, a need for a resilient coupling for abrasive discs which can withstand heavy duty applications.

In general, it is an object of the present invention to provide a resilient coupling for abrasive discs which can withstand heavy duty operations undertaken with the abrasive discs.

Another object of the invention is to provide a resilient coupling of the above character in which additional support is provided for transmitting torque to a large support abrasive disc.

A further object of the invention is to provide a resilient coupling of the above character which is relatively simple to fabricate and which is safe to operate at high rotational speeds.

Additional objects and features of the invention will appear from the following description in which the preferred embodiment has been set forth in detail in conjunction with the following drawings.

Referring to the drawings:

FIGURE 1 is a rear elevational view of a resilient coupling incorporating the present invention with an abrasive disc secured thereto;

FIGURE 2 is a front elevational view of the coupling and abrasive disc shown in FIGURE 1;

FIGURE 3 is an enlarged cross-sectional view taken along the line 3—3 of FIGURE 1.

The resilient coupling shown in the drawing consists of a driving hub member 11 adapted to be mounted on a rotatable spindle of a driving machine or device. The driving hub member 11 is provided with a first enlarged portion 11a and a second enlarged portion 11b. The enlarged portion 11b has a diameter substantially greater than the enlarged portion 11a to provide a shoulder 12 for a purpose hereinafter described. The driving hub member 11 is also provided with a threaded bore 13 and is adapted to be mounted on the spindle as shown. The driving hub member is formed with a control recess 14 in its outer wall.

A driven hub member 15 in axial alignment with the driving hub member 11, but spaced from the driven hub member. The driven hub member 15, as shown, extends into the recess 14 provided in the enlarged portion 11b of the driving hub 11. It will be noted that the outer diameter of the driven hub member 15 is substantially less than the diameter of the recess 14 in the driving hub member so that the driven hub member does not engage the driving hub member. The hub member 15 is formed with a threaded bore 16 and a radially extending flange 17. The flange 17 extends at right angles to the axis of the threaded bore 16. The driven hub member 15 is provided on its outer face with a centrally disposed annular recess 18 which adapts the hub member 15 for use with depressed center discs such as the depressed center disc 19 shown in the drawing. Means is provided for securing the depressed center disc 19 to the driven hub member and consists of a threaded retaining nut 21 provided with a radially extending flange 22. The nut, as shown, is adapted to extend through the central bore in the depressed center disc and to be threaded into the threaded bore 16 of the driven hub member so that the flange 22 of the nut draws the abrasive disc into firm engagement with the flange 17 of the driven hub member 15.

An annular member 23 of suitable resilient material such as rubber is disposed between the outer end of the driving hub member 11 and the inner face of the flange 17 of the driven hub member. A cup-shaped member 24 of resilient material having a central opening 26 encompasses portion 11b of the driving hub member 11. The opening 26 is in registration with the enlarged portion 11a the portion of the member 21 surrounding the opening 26 overlies the shoulder 12. The member 24 is of such a size that its outer surface is in engagement with the annular member 23.

A substantially cup-shaped shell-like member of relatively rigid material is mounted over the resilient members 23 and 24 and serves to generally enclose the resilient members. The shell is provided with a flange 28 which is secured to the flange 17 of the driven hub member by a suitable means such as rivets 29. It will be noted that the inner surface of the flange 17 has been recessed at 31 to accommodate the flange 28 so that the flange 28 is substantially flush with the inner surface of the flange 17. The shell-like member is provided with a central opening 32 which extends about the enlarged portion 11a of the driving hub 11. It has a diameter substantially greater than that of the diameter of the portion 11a so that an annular recess 32 is provided between the portion 11a and the shell-like member. This ensures that there will be no direct contact between the driving hub member and the driven hub member.

Use of my resilient coupling may now be briefly described as follows. Let it be assumed that a depressed center or raised hub abrasive disc such as that shown in the drawing has been secured to the coupling by the retaining nut 21 and the coupling has been mounted on the spindle of the driving machine. In utilizing the disc for grinding, sanding or polishing, the torque from the spindle is transferred to the disc through the resilient members 23 and 24 and not directly through the metal parts of the coupling because, as can be seen from the drawing, none of the metal parts are directly in contact with each other. The portion 11a of the driving hub member 11 is completely enclosed by the resilient members 23 and 24. The driving hub member 11 is never in direct engagement with the driven hub 15. The shell 27 is never in engagement with the driving hub member 11 because of the annular space 32 provided between the shell and the driving hub member.

The resilient coupling, however, is constructed in such a manner that the coupling is able to transfer adequate torque to the disc 19 from the spindle so that torque operations can be undertaken by the disc 19. The torque is readily transmitted by the coupling because the shell 27 places the resilient members 23 and 24 under compression. The driving hub member 11 is therefore, firmly grasped by the resilient members so that the torque applied thereto is transferred to the driven hub member 15 through the members 23 and 24. It will be noted that shell 27 places the members 23 and 24 under compression and serves to urge the portion of the cup-shaped member 24 surrounding the opening 26 into engagement with the shoulder 12 of the driving hub so that the member 24 firmly grasps the hub. Therefore, shearing of the resilient members 23 and 24 cannot readily occur. Thus, it can be seen that my coupling serves to provide means for coupling the disc to the spindle through which adequate torque can be transmitted to the disc, while at the same time retaining the advantages of a resilient coupling.

The resilient coupling herein described is particularly adaptable for use with a depressed or raised center disc. Such discs, as is well known to those skilled in the art, are formed of bonded abrasives and are particularly designed to be used on an edge for removing welds. Such discs are relatively thin and are generally operated at very high speeds.

The resilient couplings serves to absorb shock which may be encountered by the disc during its use. Severe shock loads may be placed on the disc by an operator who treats the disc roughly or when the disc is being used for smoothing a very rough surface. The resilient coupling also serves to dampen any vibration due to an unsymmetrical disc, out-of-round shafts and the like by dampening or removing the shock loads placed on the disc. The resilient coupling also serves to prevent fracture of the disc and also eliminates excessive wear of the disc and the tool carrying the disc. In addition, the resilient coupling eliminates excessive operator fatigue. Bouncing and jumping of the disc as it is used is eliminated to prevent uneven wear on the disc and a rough finish on the work.

I claim:

1. In a resilient coupling for an abrasive disc adapted to be mounted on a rotating spindle, a rigid driving hub member adapted to be secured to the spindle and having an enlarged portion, a driven hub member means adapted to secure the abrasive disc to the driven hub member, resilient material in the form of a flat annular member disposed between the driving hub and the driven hub member, the driven hub member having a substantially cylindrical portion extending into the driving hub member and serving to confine the inner margin of the annular member, additional resilient material enclosing a substantial portion of the outer surface of the driving hub member, and a relatively rigid shell-like member secured to the driven hub member and enclosing said first named and additional resilient material.

2. A resilient coupling as in claim 1 wherein said enlarged portion on the driving hub member forms a shoulder and the additional resilient material encloses the shoulder and wherein a portion of shell-like member overlies the shoulder.

3. A resilient coupling as in claim 1 wherein said driven hub member includes a radially extending flange and wherein said first named resilient material comprises an annular member in engagement with said flange.

4. In a resilient coupling for an abrasive disc adapted to be mounted on a rotating spindle, a solid, unitary driving hub member adapted to be secured to the spindle, the driving hub member formed to include an enlarged portion forming an annular shoulder, a driven hub member spaced from the driving hub member and having a radially extending flange, means adapted to secure the abrasive disc to the flange of the driven hub member, resilient material disposed between the driving hub member and the driven hub member, additional resilient means enclosing the driving hub member and overlying the shoulder formed on the driving hub member, a shell-like member secured to the flange of the driven hub member enclosing the first named member and said additional resilient means and having a portion overlying the shoulder formed on the driving hub member, the shell-like member also having a radially extending flange overlying the flange of the driven hub member and means for securing the flange of the shell-like member to the flange of the driven member.

5. A resilient coupling as in claim 4 wherein the annular shoulder of the driving hub member is an integral part of said member.

References Cited in the file of this patent

UNITED STATES PATENTS

| | | |
|---|---|---|
| 2,098,703 | Geyer | Nov. 9, 1937 |
| 2,727,368 | Morton | Dec. 20, 1955 |
| 2,767,527 | Tocci-Guilbert | Oct. 23, 1956 |
| 2,802,353 | Pierce | Aug. 13, 1957 |